United States Patent
Choi et al.

(10) Patent No.: US 8,307,852 B2
(45) Date of Patent: Nov. 13, 2012

(54) PINION VALVE BODY AND PINION VALVE ASSEMBLY FOR VEHICLE EQUIPPED WITH THE SAME

(75) Inventors: Byung-yun Choi, Wonju (KR); Jong-sik Byeon, Wonju (KR); Geun-soo Choi, Wonju (KR); Byung-ki Moon, Cheonan (KR); Ja-moon Ku, Cheongwon (KR); Ji-heon Choi, Cheonan (KR)

(73) Assignees: Mando Corporation, Pyeongtaek (KR); Halla Stackpole Corporation, Cheongwon-Gun (KR)

( * ) Notice: Subject to any disclaimer, the term of this patent is extended or adjusted under 35 U.S.C. 154(b) by 736 days.

(21) Appl. No.: 12/484,587

(22) Filed: Jun. 15, 2009

(65) Prior Publication Data

US 2009/0308242 A1 Dec. 17, 2009

(30) Foreign Application Priority Data

Jun. 17, 2008 (KR) .............................. 2008-0056975

(51) Int. Cl.
*B62D 5/083* (2006.01)
*F15B 13/04* (2006.01)
(52) U.S. Cl. ............ 137/625.23; 137/625.24; 91/375 A; 180/441
(58) Field of Classification Search ............. 137/625.21, 137/625.23, 625.24; 91/375 R, 375 A; 180/441, 180/442
See application file for complete search history.

(56) References Cited

U.S. PATENT DOCUMENTS

| | | | | |
|---|---|---|---|---|
| 3,921,669 A * | 11/1975 | Goff | ........................ | 137/625.24 |
| 4,137,989 A * | 2/1979 | Rehfeld | ....................... | 91/375 A |
| 4,178,835 A * | 12/1979 | Millard | ........................ | 91/375 A |
| 4,276,812 A * | 7/1981 | Dymond | ................... | 137/625.24 |
| 4,353,288 A * | 10/1982 | Holub | ............................ | 91/375 A |
| 4,544,131 A * | 10/1985 | Adams | ....................... | 137/625.24 |
| 4,768,554 A * | 9/1988 | Takeuchi et al. | ......... | 137/625.24 |
| 4,966,192 A * | 10/1990 | Umeda | ..................... | 137/625.24 |
| 5,069,250 A * | 12/1991 | Emori et al. | ............... | 137/625.24 |
| 5,069,425 A * | 12/1991 | Kojima et al. | ............... | 91/375 A |
| 5,109,753 A * | 5/1992 | Kobayashi | ................... | 91/375 A |
| 5,230,273 A * | 7/1993 | Fraley, Jr. | .................... | 91/375 A |
| 5,447,209 A | 9/1995 | Sasaki et al. | | |
| 5,794,508 A * | 8/1998 | Gerigk | ........................ | 91/375 A |
| 5,870,941 A * | 2/1999 | Spillner et al. | .............. | 91/375 A |
| 6,296,018 B1 * | 10/2001 | Place | ........................... | 91/375 A |

FOREIGN PATENT DOCUMENTS

JP 60033166 A * 2/1985 ............... 137/625.21

OTHER PUBLICATIONS

Chinese Office Action, with English translation, issued in Chinese Patent Application No. 200910149940.6, mailed Nov. 11, 2010.

* cited by examiner

*Primary Examiner* — John Rivell
(74) *Attorney, Agent, or Firm* — McDermott Will & Emery LLP

(57) ABSTRACT

A pinion valve body and a vehicle pinion valve assembly with the valve body are disclosed. The pinion valve body has a lower sleeve integrally formed by a sintering process along with upper splines to block an oil leakage and thus there are no needs any more for the conventional separate lower sleeve as well as the associated machining of sleeve fitting areas on the valve body and the process of press-fitting such sleeve all together, thereby effectively reducing the general manufacturing steps and their cost.

4 Claims, 9 Drawing Sheets

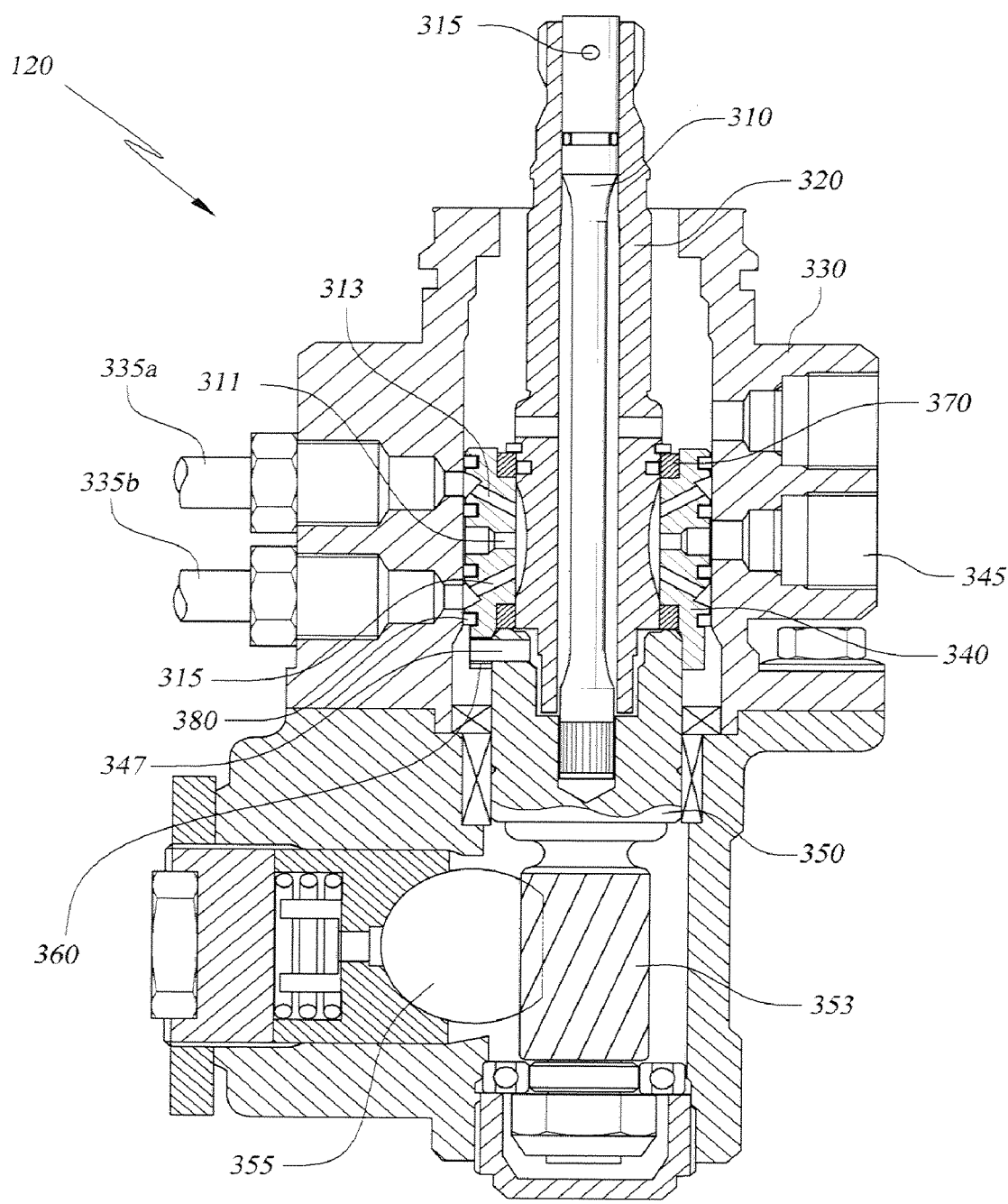

PINION VALVE BODY AND PINION VALVE ASSEMBLY FOR VEHICLE EQUIPPED WITH THE SAME

TECHNICAL FIELD

An embodiment of the present invention relates to a pinion valve body and a vehicle pinion valve assembly with the valve body for a vehicle hydraulic power steering apparatus. More particularly, the present embodiment relates to a pinion valve body having a lower sleeve integrally formed by a sintering process along with lower splines to block an oil leakage and a vehicle pinion valve assembly with the valve body obviating the needs for both an extra machining of the splines and the conventional separate lower sleeve as well as the associated machining of sleeve fitting areas on the valve body and the process of press-fitting such sleeve all together, thereby effectively reducing the general manufacturing steps and their cost.

BACKGROUND OF THE DISCLOSURE

Generally speaking, a steering apparatus of a vehicle is to assist changing the direction of vehicle as the driver intends by turning front wheels in the same direction about their respective pivot axes.

Meanwhile, the hydraulic power steering apparatus assists a driver's operation of the vehicular steering wheel with a boosting device for boosting a steering force to change directions of the vehicle.

Such hydraulic power steering apparatuses may be generally classified into HPS (Hydraulic Power Steering Apparatus) and EPS (Electric Power Steering Apparatus). In the hydraulic power steering apparatus, an oil pump connected to an engine rotary shaft supplies an actuation fluid to an actuation cylinder connected with a rack bar to allow the driver to steer with the boosted force.

In contrast, instead of the oil pump and actuation cylinder, the electric power steering apparatus has a rack bar or a column-installed motor and an ECU (Electronic Control Unit) for a motorized operation of the steering maneuver. Although recent trends show increased use of the electric power steering apparatuses, most vehicles still carry hydraulic power steering apparatuses.

FIG. 1 is a perspective view of a vehicle hydraulic power steering apparatus 100 and FIG. 2 is a sectional view of the same. As shown, the hydraulic power steering apparatus 100 is installed at the lower end of a steering shaft (not shown) to which a steering wheel (not shown) is mounted and comprises a pinion valve assembly 120 for controlling the direction of the actuation fluid in steering and an actuation cylinder 140 for applying an actuation force to tie rods 115, which steer the vehicle wheels (not shown) in response to the operation of the pinion valve assembly 120.

The hydraulic power steering apparatus 100 comprises a hydraulic system where the actuation fluid supplied from oil pump 130 may be delivered to pinion valve assembly 120, selectively fed to two pressure chambers 205, 210 at opposing sides about a piston inside actuation cylinder 140 in response to the rotational directions of the steering shaft to assist the driver's steering maneuver, and then retires its actuations from pinion valve assembly 120 by flowing back to an oil reservoir tank 131 and finally supplied back to oil pump 103 via an inlet hose 132.

FIG. 3A is a sectional view of a pinion valve assembly of a conventional vehicle hydraulic power steering apparatus and FIG. 3B is a sectional view of a conventional pinion valve body.

As shown in FIG. 3A, a pinion valve assembly 120 has a hollow input shaft 320 rotating in association with a steering wheel (not shown), a torsion bar 310 inserted in the interior of input shaft 320 and fastened at its top to input shaft 320 by a pin 315, a pinion shaft 350 press-fitted with a lower end of torsion bar 310 and meshed with a rack gear of a rack bar 355 of an actuation cylinder and a pinion valve body 340 fastened to an upper end of pinion shaft 350 by a pin 347 and sleeved over input shaft 320.

The thus constructed hydraulic power steering apparatus boosts a manual steering force, which rotates a steering shaft (not shown) along with input shaft 320 of pinion valve assembly 120, when actuation fluid, which is under pressure from an oil pump (not shown) and supplied through a supply port 345, is selectively fed into a left or right pressure chamber (see chambers 205, 210 of FIG. 2) of the actuation cylinder via a left port 335a or a right port 335b.

As shown in FIG. 3B, pinion valve body 340 of the conventional hydraulic power steering apparatus is made by lathe-turning a hollow cylindrical steel member to machine its interior and exterior surfaces followed by broaching or slotting to form a pin hole 360, O-ring grooves 380, a supply hole 311, a left discharge hole 313, a right discharge hole 315, etc. Then, pinion valve body 340 needed press-fit assembly of top and bottom sleeves 370 for preventing oil leaks resulting in a higher material cost as well as an extra manufacturing cost due to the lathe-turning, broaching or slotting to add to the manufacturing process and total number of components.

DISCLOSURE OF THE INVENTION

In order to solve these problems, the present disclosure provides a pinion valve body having a lower sleeve integrally formed by a sintering process along with upper splines to block an oil leakage and a vehicle pinion valve assembly with the valve body obviating the needs for both an extra machining of the splines through the broaching or slotting and the conventional separate lower sleeve as well as the associated machining of sleeve fitting areas on the valve body and the process of press-fitting such sleeve all together, thereby effectively reducing the general manufacturing steps and their cost.

i. An embodiment of the present disclosure provides a pinion valve body for a hydraulic power steering apparatus with an actuation cylinder including a left pressure chamber and a right pressure chamber comprising:

outer diameter areas having a number of O-ring grooves circumferentially formed thereon, a number of supply holes for receiving oil in the pinion valve body from an oil pump, a number of left and right discharge holes for discharging oil to the left and right pressure chambers, respectively; inner diameter areas having raised surfaces with the supply holes formed penetrating therethrough and a number of splines recessed radially toward the outer diameter areas and extending alternately of the raised surfaces, the splines having the left and right discharge holes formed penetrating therethrough; an integral lower section having a seat extending radially outwardly from the inner diameter areas where the splines merge with the raised areas extending from the splines, a recess extending radially outwardly from circumferential surfaces of the inner diameter areas under the seat and a pin hole formed terminally of the recess; and an integral upper section having a sleeve mount extending radially outwardly from the inner diameter areas.

In addition, the present disclosure provides a pinion valve assembly for a hydraulic power steering apparatus having an actuation cylinder connected with a rack gear of a rack bar to allow a driver to steer with a boosted force comprising:

the pinion valve body; a hollow input shaft rotating in association with a steering shaft and having the pinion valve body circumferentially sleeved thereon; a torsion bar inserted in an interior of the input shaft and fastened at its top to input shaft by a pin; and a pinion shaft press fitted with a lower end of the torsion bar and meshed with the rack gear of the rack bar of the actuation cylinder.

According to the present disclosure, the pinion valve body has a lower sleeve integrally formed by a sintering process along with upper splines to block an oil leakage and thus there are no needs any more for the conventional separate lower sleeve as well as the associated machining of sleeve fitting areas on the valve body and the process of press-fitting such sleeve all together, thereby effectively reducing the general manufacturing steps of the pinion valve body and their cost.

BRIEF DESCRIPTION OF DRAWINGS

The above and other objects, features and advantages of the present disclosure will be more apparent from the following detailed description taken in conjunction with the accompanying drawings, in which:

FIG. 3A is a sectional view of a pinion valve assembly of a conventional vehicle hydraulic power steering apparatus;

DETAILED DESCRIPTION OF THE EXEMPLARY EMBODIMENTS

Figure 1:
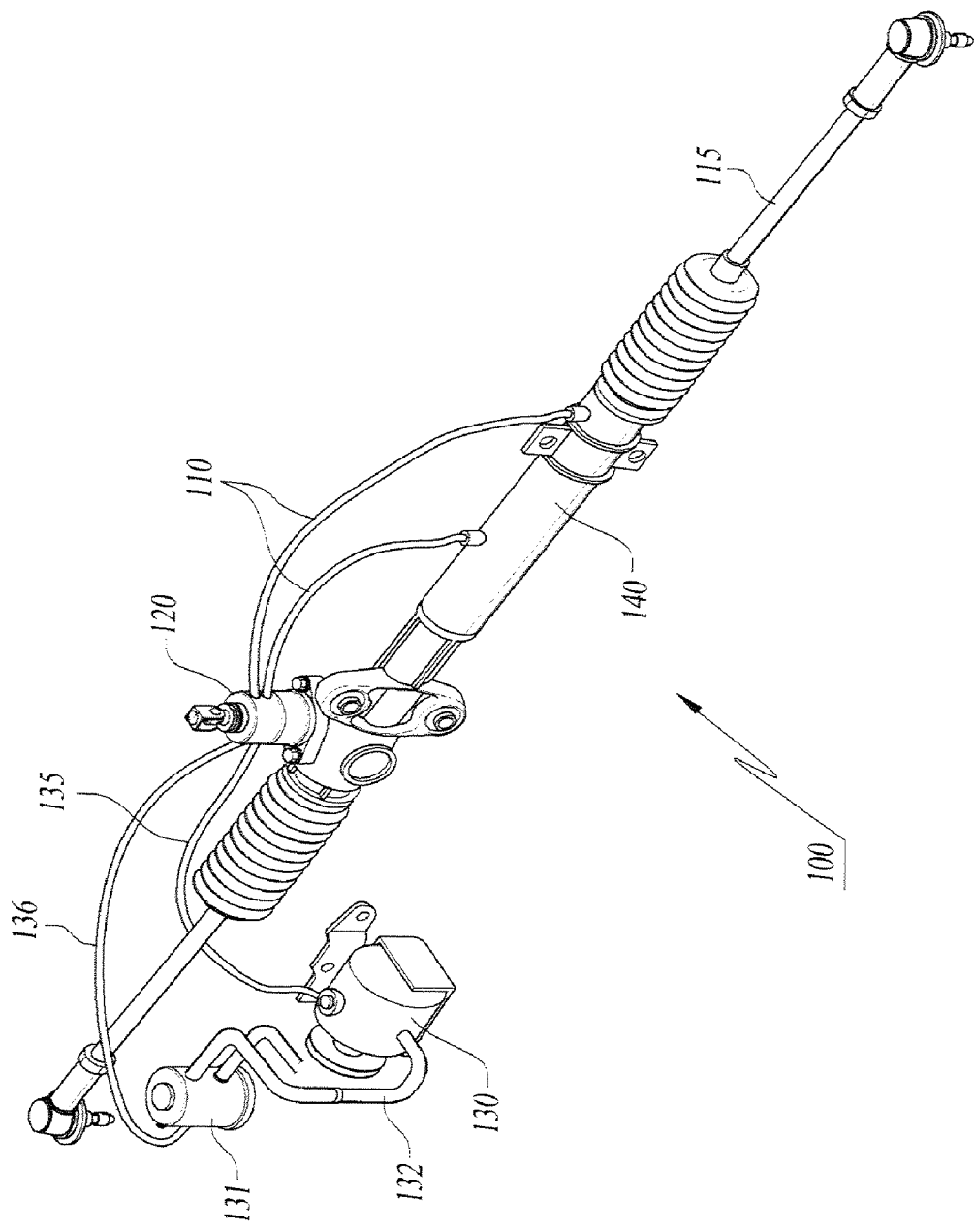
FIG. 1 is a perspective view of a vehicle hydraulic power steering apparatus.
Figure 2:
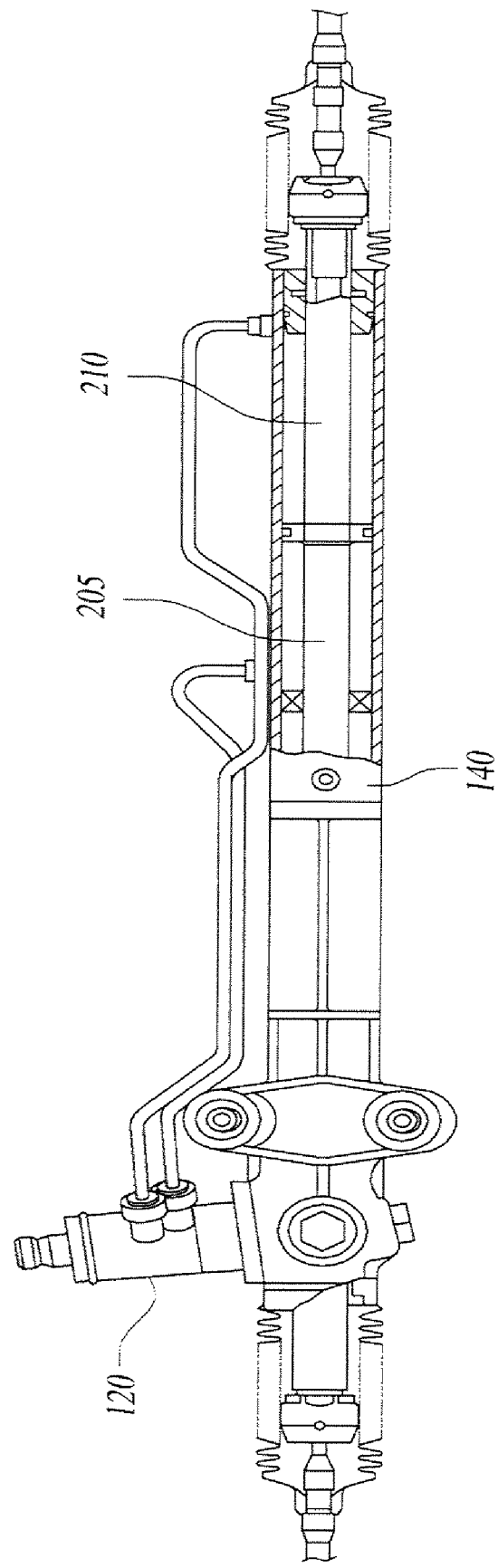
FIG. 2 is a sectional view of the vehicle hydraulic power steering apparatus.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present invention, they may be numbered using the terms of a first, a second, A, B, (a), (b) etc. These terms are used for the sake of differentiating between the components and not intended to specify the natures, orders, sequences or others. When a component is described as "connected", "joined", or "linked" to another component, it should be understood that they may be connected or linked together not only literally but also with extra components "connecting", "joining", or linking thereof.

Figure 4:
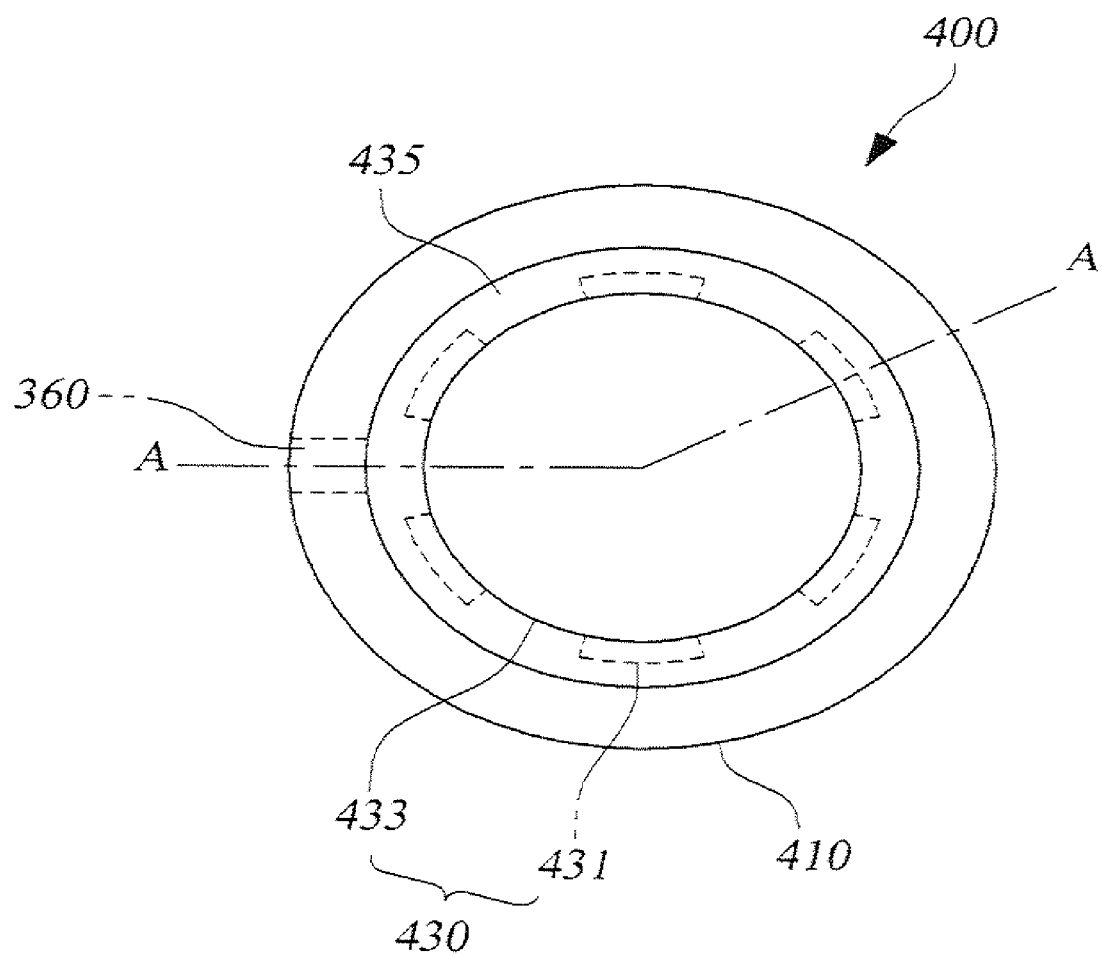
FIG. 4 is a plan view of a pinion valve body of a hydraulic power steering apparatus according to an embodiment of the present disclosure.
Figure 5:
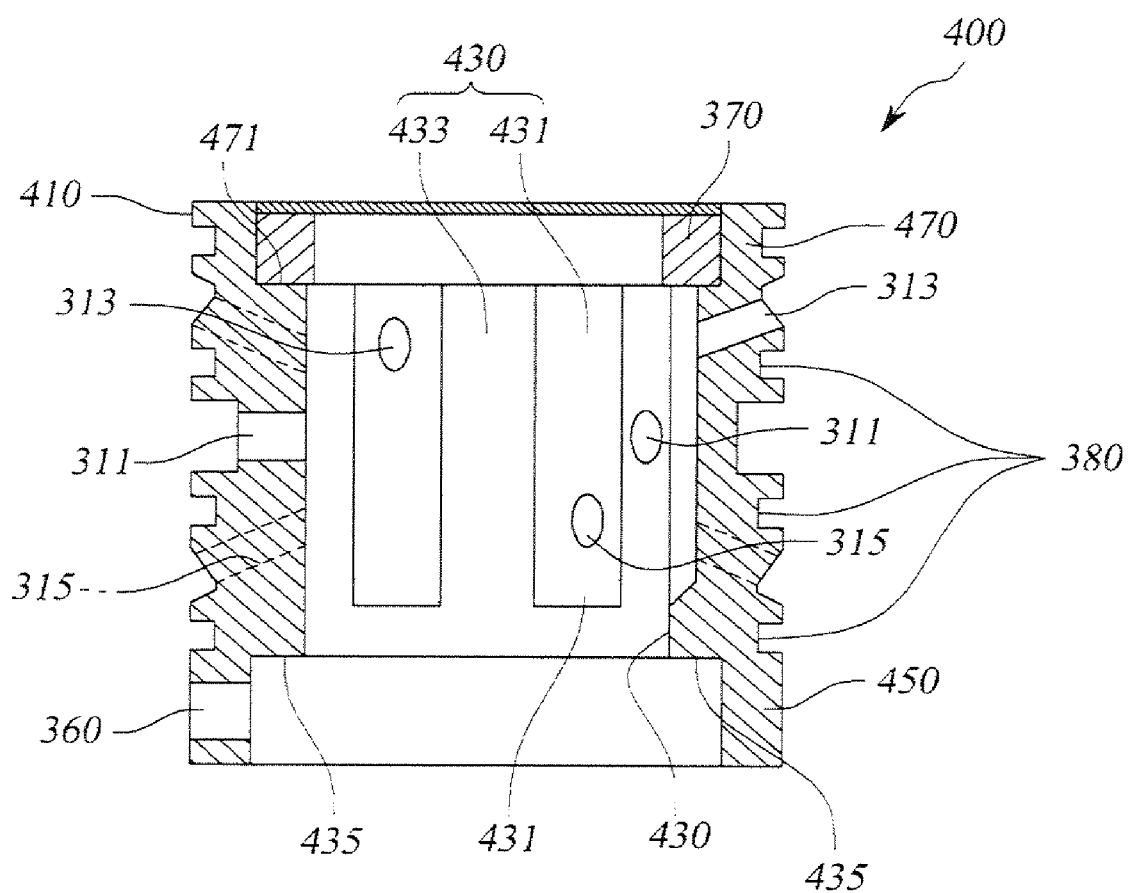
FIG. 5 is a partial sectional view taken along line A-A of FIG. 4 of the pinion valve body of a hydraulic power steering apparatus according to an embodiment of the present disclosure.

FIG. 4 a plan view of a pinion valve body 400 of a hydraulic power steering apparatus according to an embodiment of the present disclosure and FIG. 5 is a partial sectional view taken along line A-A of the pinion valve body of FIG. 4. As illustrated, pinion valve body 400 of the present disclosure has a hollow cylindrical structure generally defining outer diameter areas 410, inner diameter areas 430, a lower section 450 and an upper section 470. On the outer diameter surfaces of outer diameter areas 410, there are provided a number of O-ring grooves 380 and a number of through holes are formed among the O-ring grooves 380 communicating outer diameter areas 410 with inner diameter areas 430.

Specifically, midway between the upper and lower sections of outer diameter areas 410 there are provided a supply hole 311 for receiving a fluid of oil from an oil pump and a couple of left and right discharge holes 313, 315 for discharging oil to the left and right pressure chambers, respectively to assist the driver's manual steering force by having oil from the oil pump sent in response to the rotation of the input shaft to the left and right pressure chambers (see the parts at 205 and 210).

On the inner diameter areas 430, supply hole and left and right discharge holes 313, 315 may be open wherein supply hole 311 may be located in raised areas 433 with respect to multiple female splines 431, which are withdrawn to a predetermined depth of the valve body 400 and distanced equidistantly circumferentially thereof.

Splines 431 have left and right discharge holes 313, 315 respectively with the lower ends of splines merging with raised areas 433 from which an annular seat having an expanded diameter extends.

Figure 3B:
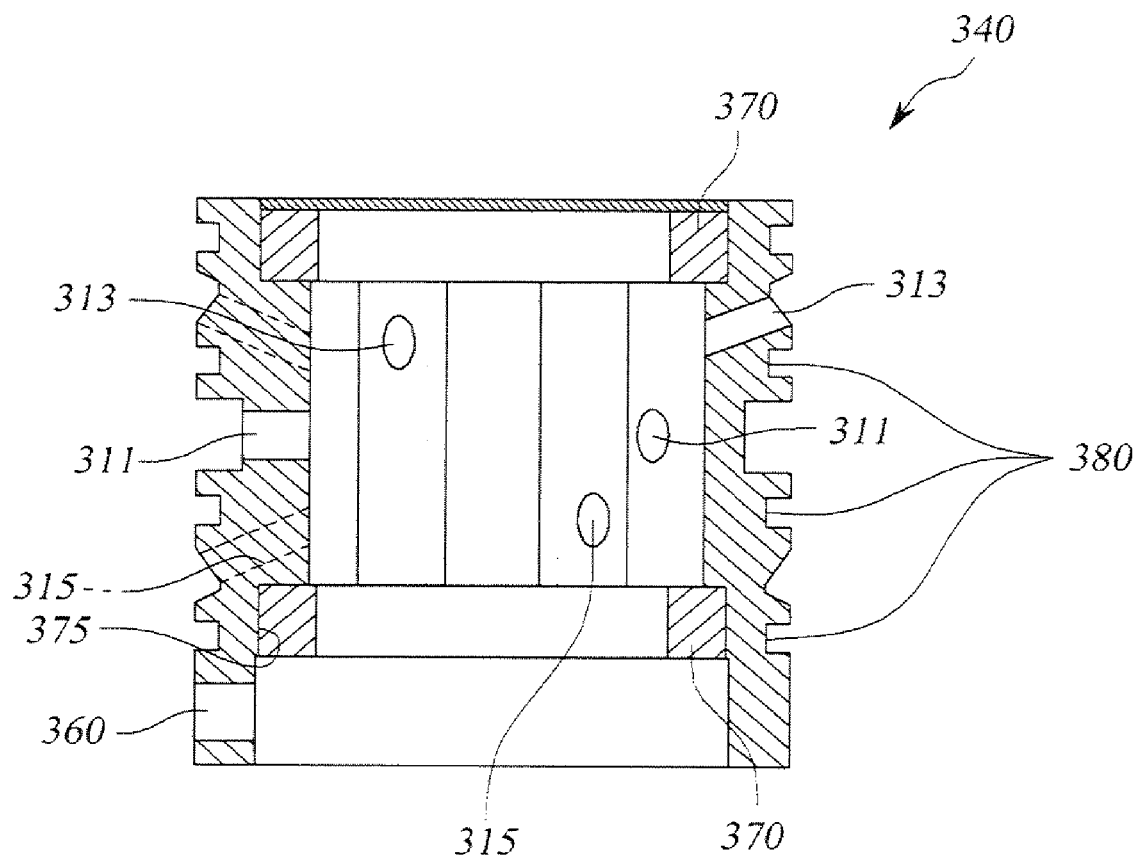
FIG. 3B is a sectional view of a conventional pinion valve body.

Compared to the corresponding sections of valve body 340 of FIG. 3B, the present pinion valve body 400 that has an integral sleeve formed by sintering to replace the conventional counterpart of sleeve 370 thus obviates the needs for lathe-turning the interior surfaces of pinion valve body 400, machining the interior splines 431 by broaching or slotting, forming a sleeve-fitting lower area as at 375 and others of valve body 340 of FIG. 3B and then assembling sleeve 370 by press-fitting.

Pinion valve body 400 has at one end the pin hole 360 through which a connecting pin may extend to fasten a pinion shaft to the body 400 and at the opposite top end 470 a sleeve mount 471 with an enlarged diameter from inner diameter areas 430 to shape a seat for a press-fitting sleeve 370.

On the other hand, seat 435 at the junction between splines 431 in a groove shape and raised areas 433 functions as a sleeve for preventing oil in splines 431 from leaking to the vale body lower section 450 as it allows valve body 400 to be seated on the pinion shaft during assembly.

Figure 6:
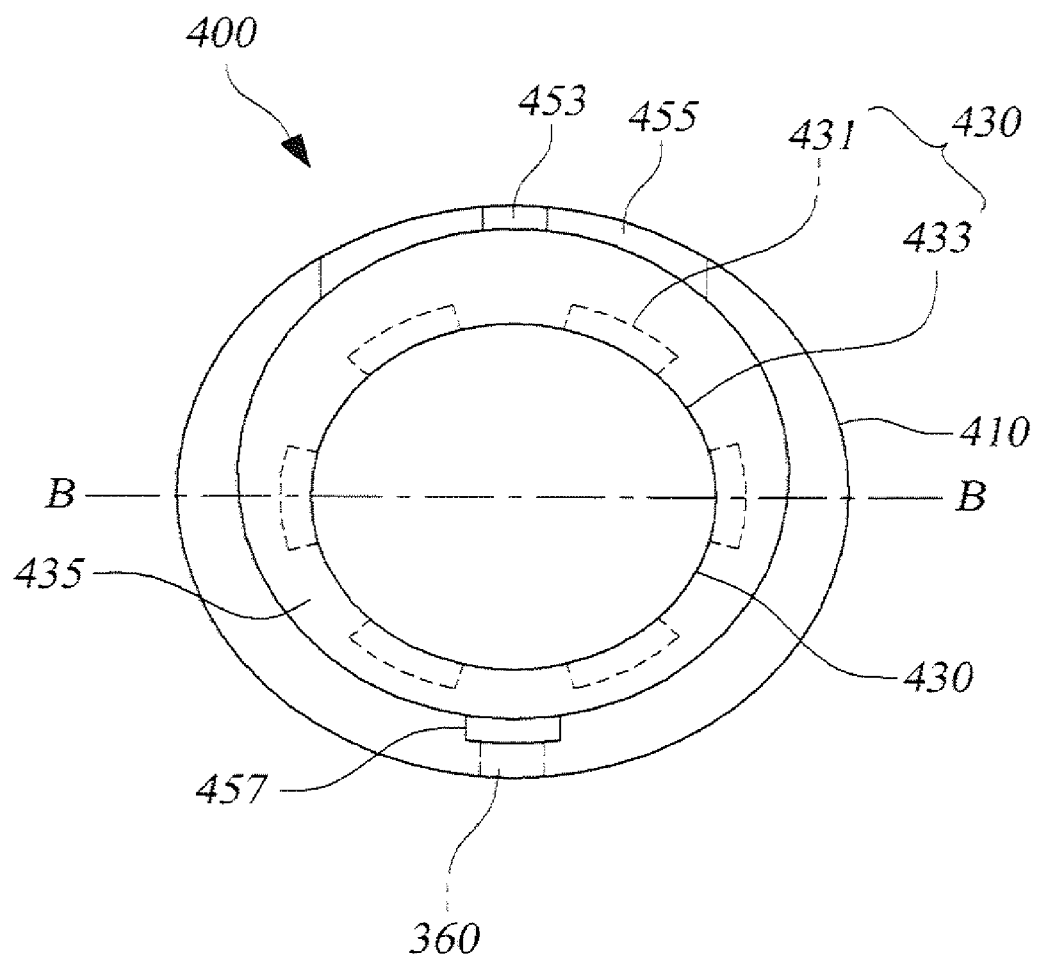
FIG. 6 is a bottom view of a pinion valve body of a hydraulic power steering apparatus according to an embodiment of the present disclosure.
Figure 7:
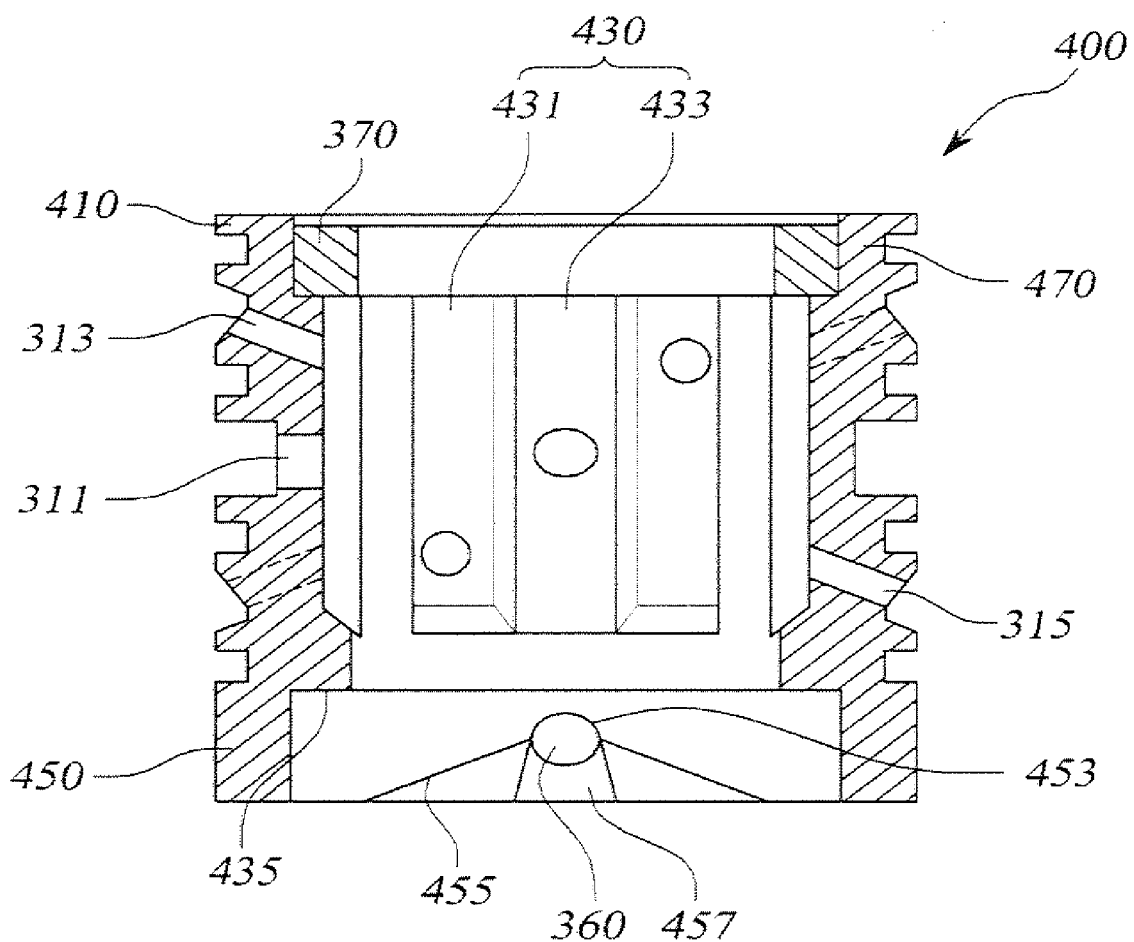
FIG. 7 is a partial sectional view taken along line B-B of FIG. 6 of the pinion valve body of a hydraulic power steering apparatus according to an embodiment of the present disclosure.

FIG. 6 is a bottom view of pinion valve body 400 of a hydraulic power steering apparatus according to an embodiment of the present disclosure and FIG. 7 is a partial sectional view taken along line B-B of FIG. 6. Pinion valve body 400 of FIG. 6 may be easier to understand in perspective in FIG. 8.

As shown in FIGS. 6 and 7, pinion valve body 400 is provided with a jig groove 453 at the diametrically opposite location of pin hole 360 formed at a side of lower section 450 and tapering slants 455 extending from both sides of jig grooves 453 to the bottom end of lower section 450. In addition, pin hole 360 at the lower lateral section and the opposite jig groove 453 are formed in valve body 400 to have different depths therethrough by forming lower section 450 in varying thicknesses from a thicker area about pin hole 360 to a thinner area around jig groove 453 to reinforce pin hole 360 in bearing the load from the turns of the steering wheel.

I.e., in FIG. 6, the lower inner diameter surface of seat 435 as viewed from lower section 450 is eccentric from the outer diameter center of valve body 400 toward jig groove 453 so that seat 435 resembles a short round slot with identical diametrically opposite radii at pin hole 360 and jig groove, respectively.

The thus formed slants 455 and jig groove 453 serve as a damage prevention means for the relatively thin lower section 450 portion and also a guide means for guiding the engagement of pinion valve body onto the pinion shaft. On the other hand, the pinion shaft may be provided at its upper section with an additional boss (not shown) in the shape of a rib which is then guided along slants 455 before it is inserted into jig groove 453.

While the described pinion shaft is not depicted to have the rib-shaped boss in the drawings, the present disclosure may be comprised of the assembly of pinion valve body 400 and the pinion shaft as the boss may be arbitrarily present on the pinion shaft. This is because slants 455 and jig groove 453 are suffice to provide the reinforcement of valve body 400 with the extra role to guide its assembly with the pinion shaft regardless of the boss thereon.

Figure 8:
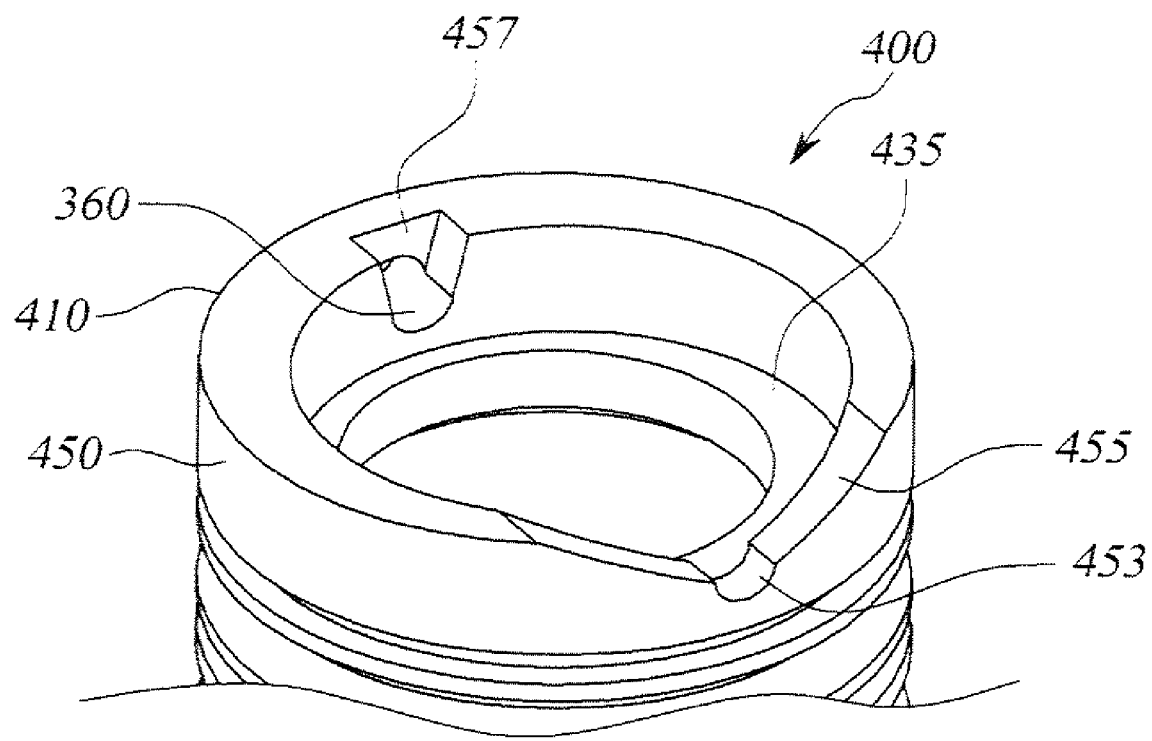
FIG. 8 is a partial perspective view of a lower section of a pinion valve of a hydraulic power steering apparatus according to an embodiment of the present disclosure.

FIG. 8 is a partial perspective view of a lower section of a pinion valve of a hydraulic power steering apparatus according to an embodiment of the present disclosure.

In FIG. 8, pinion valve body 400 is conveniently illustrated with lower section 450 facing upwards. As shown, lower section 450 is provided at its one circumferential side with recess 457 extending radially from a bottom (top on the drawing) inner edge and pin hole 360 formed at an upper end of recess 457 penetrating lower section 450. Specifically, when viewed from the center of pinion valve body 400, a triangular or trapezoidal shape of recess 457 is merged at its inner diameter side with pin hole 360.

Such triangular or trapezoidal recess 457 has a gradually narrowed contour from the edge of lower section 450 upwards (downwards on the drawing) so that the pin (see FIG. 3A at 347) inserted in the pinion shaft can glide along the slanted recess walls as it is guided into pin hole 360.

The pinion valve body according to an embodiment of the present disclosure may be made by a sintering process as opposed to conventional machining methods with solid steel material, wherein the sintering process refers to a forming method which introduces metal powder in certain mold to execute the forming with pressure at the normal temperature as is well known in the art. Thus, further detail of that process is omitted from the present disclosure.

According to the above described shape and construction, pinion valve body 400 has the integral sleeve formed by the sintering process under splines 431 to block an oil leakage obviating the needs for both an additional machining of the splines through broaching or slotting and the conventional separate sleeve for blocking oil spillage as well as the associated machining of sleeve fitting areas on the valve body and the process of press-fitting such sleeve all together. This effectively reduces the general manufacturing steps and their costs.

Although the respective components of the embodiments of the present disclosure are described above as operating singularly, the disclosure is not necessarily so limited which means that two or more of the components may be selected to be operated in an assembly. If not described to the contrary, terms used in describing and claiming the present disclosure such as "include", "comprise", "have", are to be construed in a non-exclusive manner, namely to allow for other parts or components to be present which are not explicitly indicated. If not defined otherwise, all of the terms used including technical or scientific terms are equivalent to the counterparts as understood generally by one in the killed in the art. Usual terms as defined in the dictionary are to be interpreted correspondingly to the context of the related technology rather than ideally or excessively formally unless the present disclosure clearly defines the same.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. A pinion valve body for a hydraulic power steering apparatus with an actuation cylinder including a left pressure chamber and a right pressure chamber comprising:
   outer diameter areas having a number of O-ring grooves circumferentially formed thereon, a number of supply holes for receiving oil from an oil pump, a number of left and right discharge holes for discharging oil to the left and right pressure chambers, respectively;
   inner diameter areas having raised surfaces with the supply holes formed penetrating therethrough and a number of splines recessed in a radial direction and extending alternately of the raised surfaces, the splines having the left and right discharge holes formed penetrating therethrough;
   a lower section having a seat extending radially outwardly from the inner diameter areas where the splines merge with the raised areas extending from the splines, a recess extending radially outwardly from circumferential surfaces of the inner diameter areas under the seat and a pin hole formed terminally of the recess; and
   an upper section having a sleeve mount extending radially outwardly from the inner diameter areas,
   wherein the lower section has a jig groove formed at the opposite side of the pin hole and two slants tapering the lower section from opposite ends of the jig groove to a bottom end of the lower section.

2. The pinion valve body in claim 1, wherein the circumferential surfaces of the inner diameter areas under the seat define a short slot which is formed eccentric of the center of the outer diameter areas toward the opposite side of the pin hole so that the lower section of the pinion valve body has varying thicknesses between the inner and outer diameter areas with the pin hole being located in the thicker side while the opposite side being the thinnest.

3. A pinion valve assembly for a hydraulic power steering apparatus having an actuation cylinder connected with a rack gear of a rack bar to allow a driver to steer with a boosted force comprising:
   the pinion valve body in claim 1;
   a hollow input shaft rotating in association with a steering shaft and having the pinion valve body circumferentially sleeved thereon;
   a torsion bar inserted in an interior of the input shaft and fastened at its top to an input shaft by a pin; and a pinion shaft press-fitted with a lower end of the torsion bar and meshed with the rack gear of the rack bar of the actuation cylinder.

4. A pinion valve assembly for a hydraulic power steering apparatus having an actuation cylinder connected with a rack gear of a rack bar to allow a driver to steer with a boosted force comprising:

the pinion valve body in claim 2;

a hollow input shaft rotating in association with a steering shaft and having the pinion valve body circumferentially sleeved thereon;

a torsion bar inserted in an interior of the input shaft and fastened at its top to an input shaft by a pin; and a pinion shaft press-fitted with a lower end of the torsion bar and meshed with the rack gear of the rack bar of the actuation cylinder.

* * * * *